(12) United States Patent
Shiraki

(10) Patent No.: US 8,774,175 B2
(45) Date of Patent: Jul. 8, 2014

(54) RELAY SYSTEM, RELAY APPARATUS, AND RELAY METHOD

(75) Inventor: Osamu Shiraki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 158 days.

(21) Appl. No.: 13/209,634

(22) Filed: Aug. 15, 2011

(65) Prior Publication Data

US 2012/0057590 A1    Mar. 8, 2012

(30) Foreign Application Priority Data

Sep. 7, 2010 (JP) ................. 2010-200254

(51) Int. Cl.
*H04L 12/50* (2006.01)
*H04L 12/28* (2006.01)
*H04L 12/56* (2006.01)

(52) U.S. Cl.
CPC ........ *H04L 12/2838* (2013.01); *H04L 12/2809* (2013.01); *H04L 2012/2849* (2013.01); *H04L 45/245* (2013.01)
USPC ....................................... 370/359

(58) Field of Classification Search
CPC .......... H04L 45/00; H04L 45/22; H04L 12/04
USPC .................. 370/216–228, 252, 254–255, 389
See application file for complete search history.

(56) References Cited

U.S. PATENT DOCUMENTS

| | | | | |
|---|---|---|---|---|
| 2003/0142680 A1* | 7/2003 | Oguchi | .......................... | 370/400 |
| 2008/0232384 A1 | 9/2008 | Miyabe | | |
| 2009/0207834 A1* | 8/2009 | Wakumoto et al. | ........... | 370/352 |
| 2010/0278180 A1* | 11/2010 | Ma | ................. | 370/392 |
| 2011/0317700 A1* | 12/2011 | Assarpour | ..................... | 370/392 |

FOREIGN PATENT DOCUMENTS

JP    2008-236212    10/2008

* cited by examiner

*Primary Examiner* — Chi Pham
*Assistant Examiner* — Fahmida Chowdhury
(74) *Attorney, Agent, or Firm* — Staas & Halsey LLP

(57) ABSTRACT

A relay system includes a first relay apparatus connected to a node through a first line and a second relay apparatus connected to the node through a second line. The first line and the second line belong to the same link aggregation group. The first relay apparatus includes a first control unit. The first control unit notifies, before relaying a received frame, the second relay apparatus of a source address included in the received frame in the absence of first relation information related to the source address in the first storage unit upon receiving the received frame via a port connected to the first line. The second relay apparatus includes a second control unit. The second control unit stores, in the second storage unit, second relation information regarding a relationship between the source address notified by the first relay apparatus and an output port connected to the second line.

11 Claims, 15 Drawing Sheets

RELAY SYSTEM, RELAY APPARATUS, AND RELAY METHOD

CROSS-REFERENCE TO RELATED APPLICATION

This application is based upon and claims the benefit of priority of the prior Japanese Patent Application No. 2010-200254, filed on Sep. 7, 2010, the entire contents of which are incorporated herein by reference.

FIELD

The embodiments discussed herein are related to a relay system.

BACKGROUND

FIGS. 1A and 1B illustrate an exemplary structure of a network including switch stacking. The switch stacking is a technology to connect multiple switches (layer 2 switches) by stack connection to represent the multiple switches as one switch. The switch stacking may also be referred to as switch virtualization. FIG. 1A illustrates an exemplary physical structure of the network. Referring to FIG. 1A, four switches SW-A to SW-D are connected by stack connection through stack links L1 to L4. FIG. 1B illustrates an exemplary logical structure of the network illustrated in FIG. 1A. Referring to FIG. 1B, multiple switches connected by stack connection are logically represented as one switch V. In this case, a user may manage the four switches SW-A to SW-D integrally (as one switch V).

On the other hand, a technology called link aggregation is in use, in which multiple physical links (lines) are grouped to be logically handled as one link. Use of the link aggregation allows the communication bandwidth to be improved and robustness due to redundancy to be ensured. The group of the physical links logically handled as one link is called a link aggregation group (LAG).

When the switch stacking is applied to multiple switches, the multiple switches are logically handled as one switch. Accordingly, links belonging to the same link aggregation group may be set across multiple switches.

FIG. 2 illustrates an example of link aggregation employed for switches to which the switch stacking is applied.

Referring to FIG. 2, the switch SW-B and the switch SW-C, among the four switches SW-A to SW-D to which the switch stacking is applied, are connected to a node A through different physical links. When the link aggregation is employed for the two links in this example, the node A and one logical switch (a switch stack) including the switches SW-A to SW-D are logically handled as if the node A were connected to the switch stack through one link (link aggregation group G).

However, as apparent from FIG. 2, connecting multiple switches to the same link aggregation group G physically forms a network loop. Accordingly, a frame storm may occur in the absence of appropriate handling.

Conventional methods of handling the network loop include a control method using spanning tree protocol (STP) and a control method using frames including a time to live (TTL) value.

FIG. 3 illustrates an exemplary control method using the STP. In the STP, the control is performed so that the network loop is not formed by appropriately blocking a redundant path. Referring to FIG. 3, a port connected to the stack link L4 is blocked in each of the switch SW-A and the switch SW-D.

FIG. 4 illustrates an exemplary control method using frames including a TTL value. In this method, a TTL value is included in each frame and the TTL value is decremented each time the frame passes through one switch. When the TTL value decreases to zero, the frame is discarded. As a result, the frame is prevented from being infinitely circulated over the network and the loop is substantially eliminated. In the example in FIG. 4, a frame F1 including a TTL value of one is transmitted in a direction from the switch SW-D to the switch SW-A and a frame F2 including a TTL value of two is transmitted in a direction from the switch SW-D to the switch SW-C. The frame F1 is not transferred to the stack link subsequent to the switch SW-A, and the frame F2 is not transferred to the stack link subsequent to the switch SW-B.

Japanese Laid-open Patent Publication No. 2008-236212 discloses a related technique.

SUMMARY

According to an aspect of the present invention, provided is a relay system including a first relay apparatus connected to a node through a first line and a second relay apparatus connected to the node through a second line. The first line and the second line belong to the same link aggregation group.

The first relay apparatus includes a first storage unit and a first control unit. The first storage unit stores first relation information regarding a relationship between a destination address and an output port of the first relay apparatus. The first control unit notifies, before relaying a received frame, the second relay apparatus of a source address included in the received frame in the absence of first relation information related to the source address in the first storage unit upon receiving the received frame via a port connected to the first line.

The second relay apparatus includes a second storage unit and a second control unit. The second storage unit stores second relation information regarding a relationship between a destination address and an output port of the second relay apparatus. The second control unit stores, in the second storage unit, second relation information regarding a relationship between the source address notified by the first relay apparatus and an output port connected to the second line.

The object and advantages of the invention will be realized and attained by means of the elements and combinations particularly pointed out in the claims. It is to be understood that both the foregoing general discussion and the following detailed discussion are exemplary and explanatory and are not restrictive of the invention, as claimed.

DESCRIPTION OF EMBODIMENTS

However, it is difficult to effectively introduce the STP or the TTL values to the link aggregation.

Figure 1B:
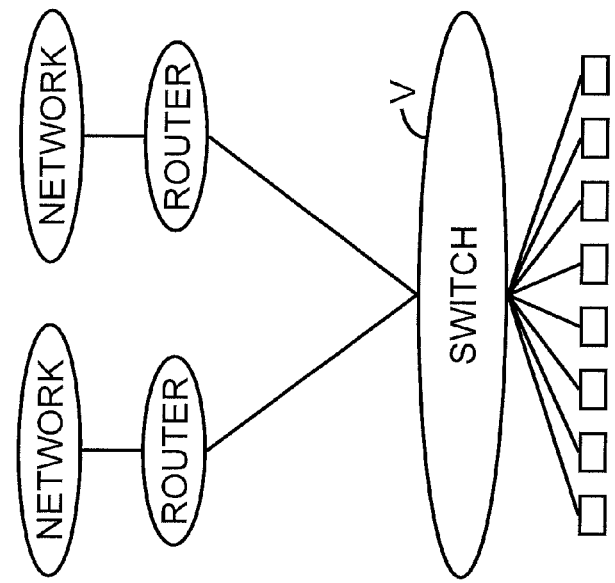
FIGS. 1A and 1B are diagrams illustrating an exemplary structure of a network including switch stacking.
Figure 1A:
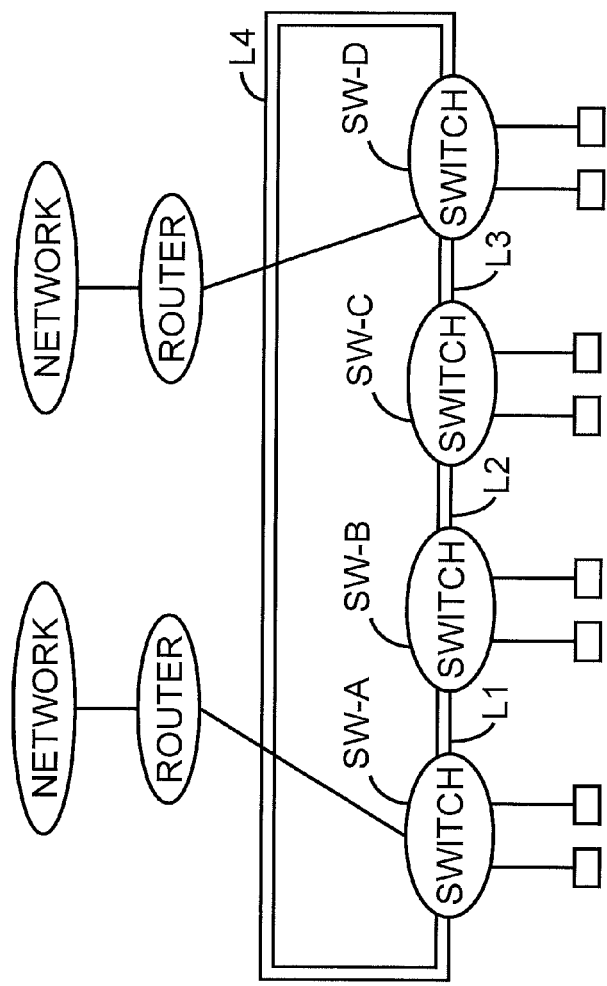
Figure 2:
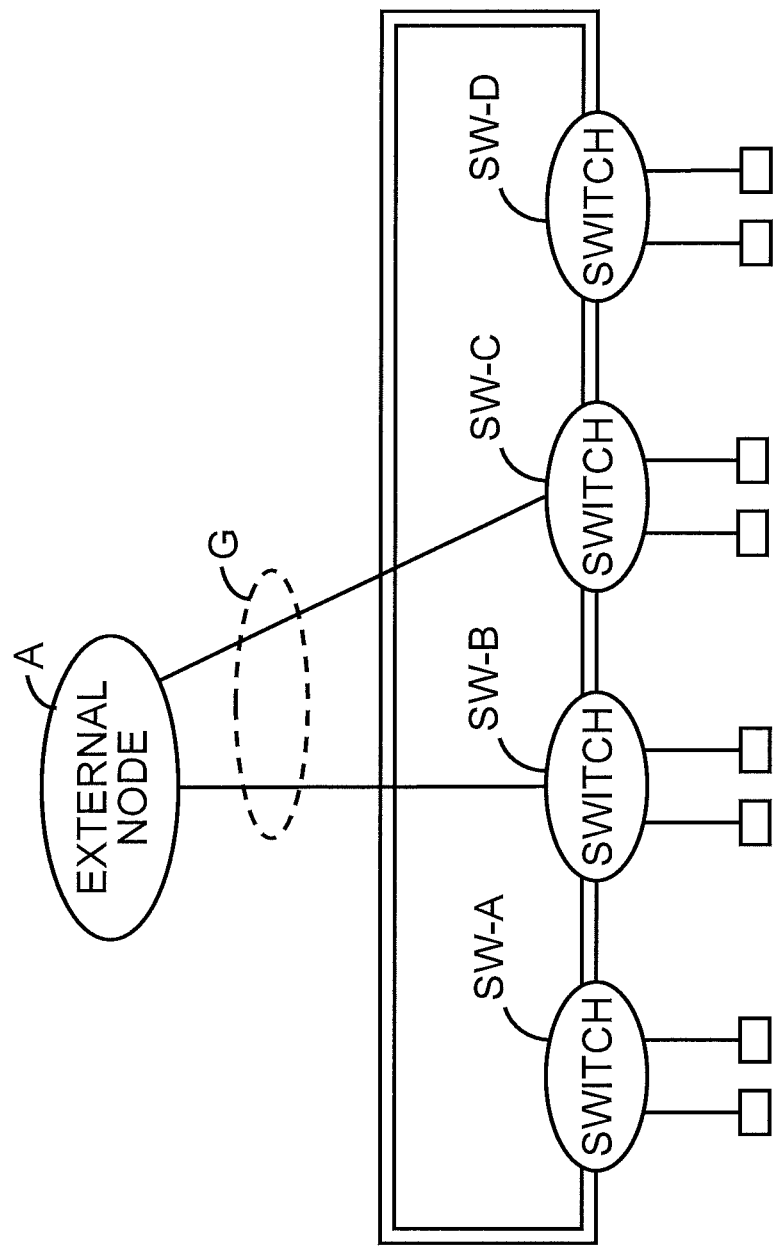
FIG. 2 is a diagram illustrating an example of link aggregation employed for switches to which switch stacking is applied.
Figure 3:
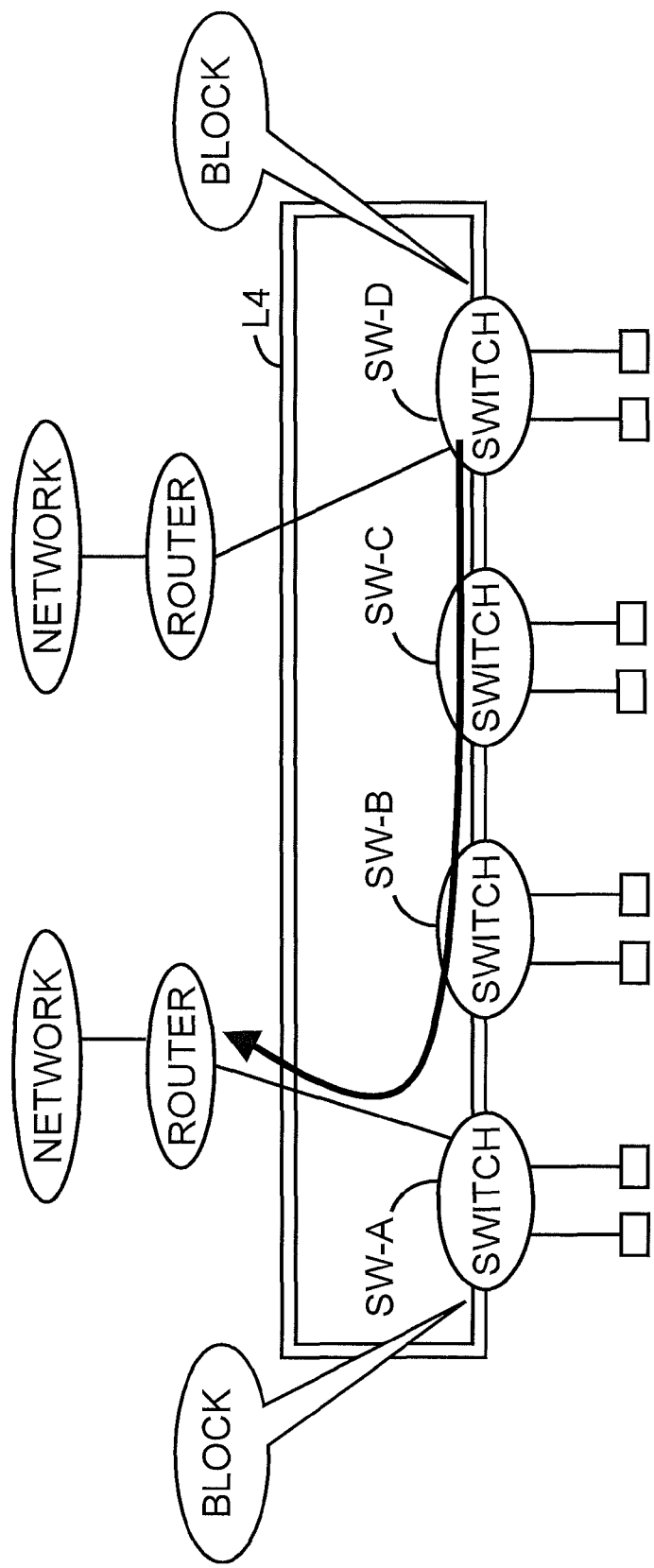
FIG. 3 is a diagram illustrating an exemplary control method using STP.
Figure 4:
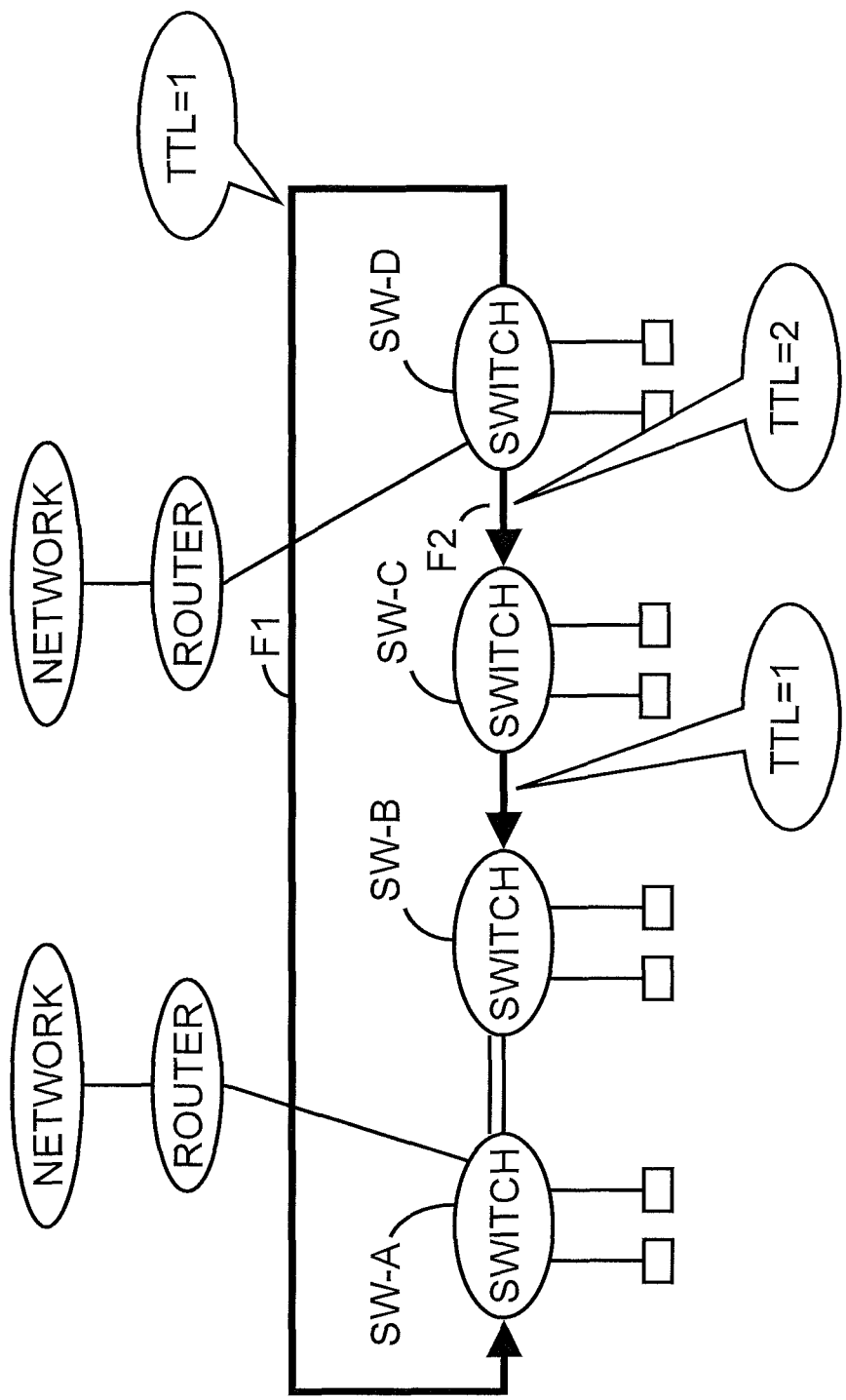
FIG. 4 is a diagram illustrating an exemplary control method using frames including a TTL.

Since the redundant path is blocked in the STP, either of the links belonging to the same link aggregation group G is blocked in the example in FIG. 2. This makes difficult to effectively use the link aggregation group G.

Figure 5:
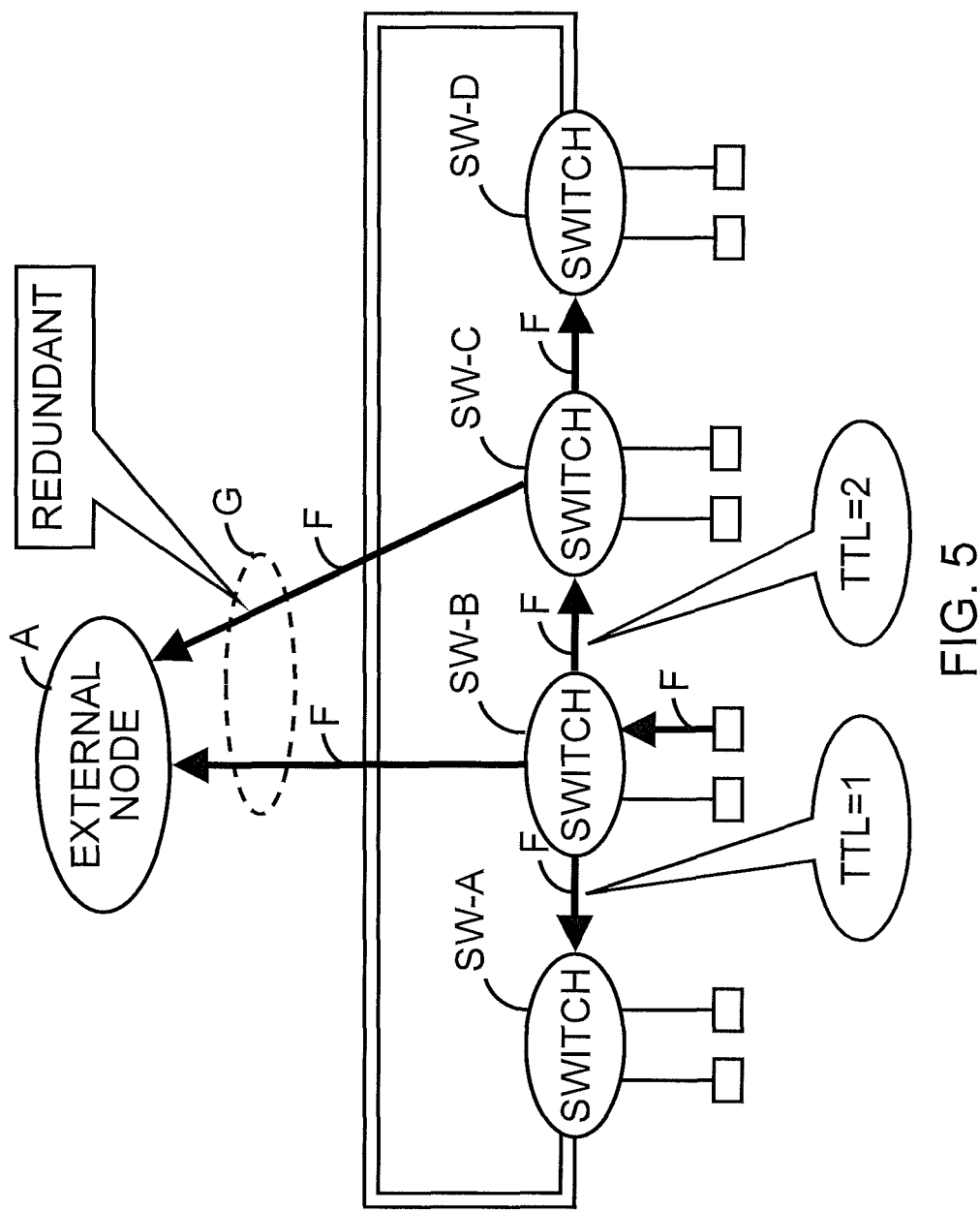
FIG. 5 is a diagram illustrating a problem occurring when link aggregation is employed for a switch stack using TTL values.

When TTL values are introduced, identical multiple frames may possibly reach the same node within a range in which the TTL values are valid, as illustrated in FIG. 5.

FIG. 5 illustrates a problem occurring when the link aggregation is employed for a switch stack using TTL values. An example is illustrated in FIG. 5, in which a frame F is input into the switch SW-B. In flooding of the frame F, the switch SW-B outputs the frame F including a TTL value of one to the switch SW-A and outputs the frame F including a TTL value of two to the switch SW-C. In this case, the frame F flooded by the switch SW-B and the frame F flooded by the switch SW-C redundantly reach the node A.

Accordingly, it is preferable to provide a relay system, a relay apparatus, and a relay method capable of improving the usefulness of the link aggregation connecting one node to multiple switches.

The embodiments may improve the usefulness of link aggregation connecting one node to multiple switches.

Figure 6:
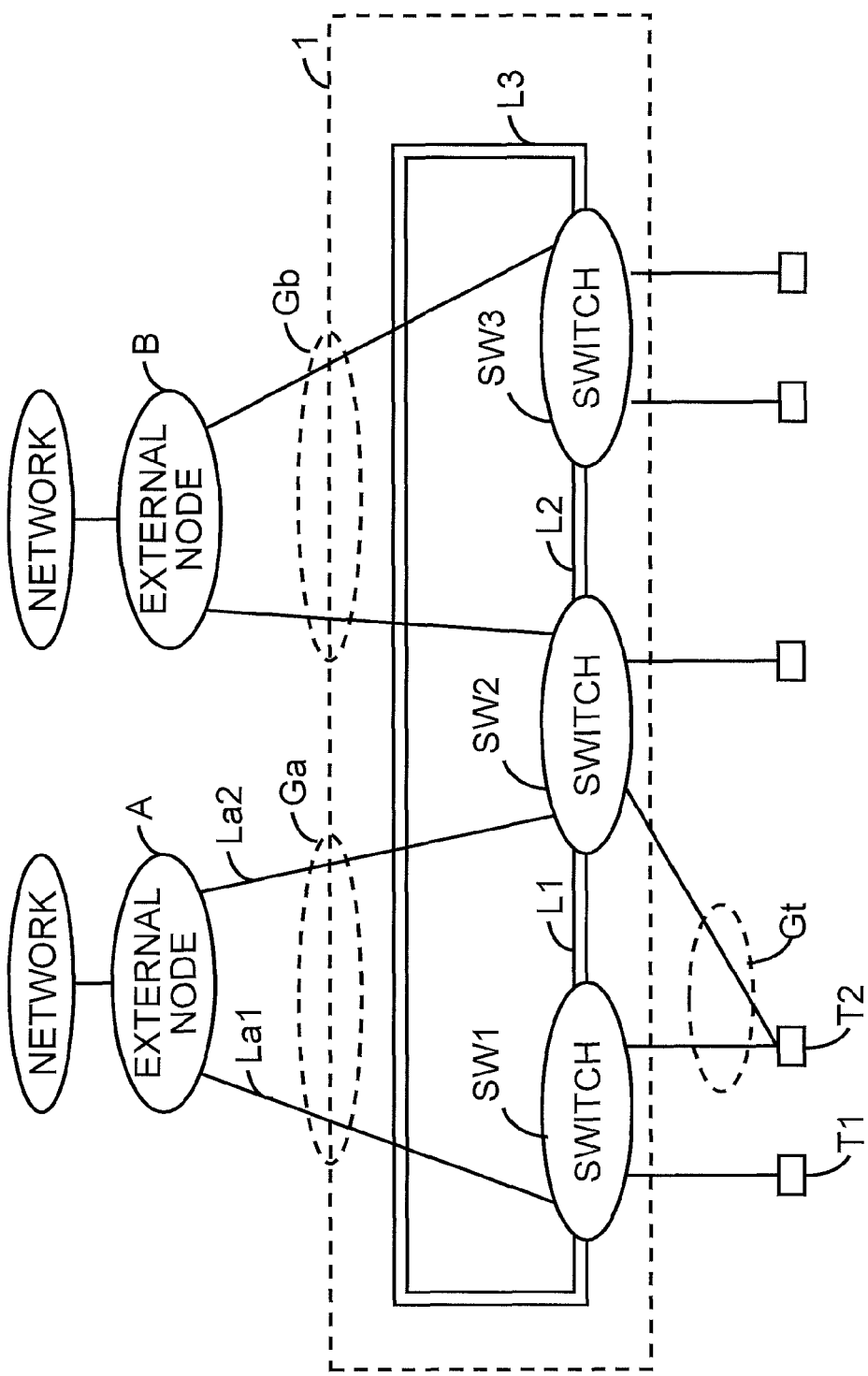
FIG. 6 is a diagram illustrating an exemplary configuration of a network according to an embodiment of the present invention.

Embodiments of the present invention will herein be discussed with reference to the attached drawings. FIG. 6 illustrates an exemplary configuration of a network according to an embodiment of the present invention.

Referring to FIG. 6, a switch stack 1 includes switches SW1, SW2, and SW3 (hereinafter referred to as a switch SW when the switches are not discriminated from each other) and is logically handled as one switch. The switch stack 1 is an example of a relay system.

Each switch SW is a layer 2 switch (or also called a switching hub) and is an example of a relay apparatus relaying frames. Each switch SW is connected by stack connection to the adjacent switches in the example in FIG. 6. A line connecting the switches is hereinafter referred to as a stack link. Stack links L1 to L3 are illustrated in FIG. 6. The stack link L3 is a redundant path to improve the failure tolerance of the network. As a result, a loop is formed for the switches SW1 to SW3.

An external node A is a network device (for example, a router) connected to the switches SW1 and SW2. An external node B is a network device connected to the switches SW2 and SW3. In other words, each of the external nodes A and B is connected to the switch stack 1 through two lines. However, the respective two lines are logically handled as one line by using the link aggregation. Specifically, two lines belonging to a link aggregation group Ga are logically handled as one line. Similarly, two lines belonging to a link aggregation group Gb are logically handled as one line. Accordingly, the external nodes A and B and the switch stack 1 are logically handled as if each of the external nodes A and B were connected to the switch stack 1 through one line.

One or more terminals T, such as a personal computer (PC), are connected to each switch SW. For example, terminals T1 and T2 are connected to the switch SW1. The terminal T2 is also connected to the switch SW2. The line connecting between the terminal T2 and the switch SW1 and the line connecting between the terminal T2 and the switch SW2 constitute one link aggregation group Gt and are logically handled as one line.

Each link aggregation group is logically handled as one line according to the above discussion. However, in the present embodiment, the lines belonging to each link aggregation group are physically connected to different (separate) switches SW. Specifically, a link La1, which is one line belonging to the link aggregation group Ga, connects the external node A to the switch SW1. A link La2, which is the other line belonging to the link aggregation group Ga, connects the external node A to the switch SW2. As a result, a loop is physically formed between the external node A, the switch SW1, and the SW2. Loops are similarly formed for the link aggregation group Gb and the link aggregation group Gt.

Figure 7:
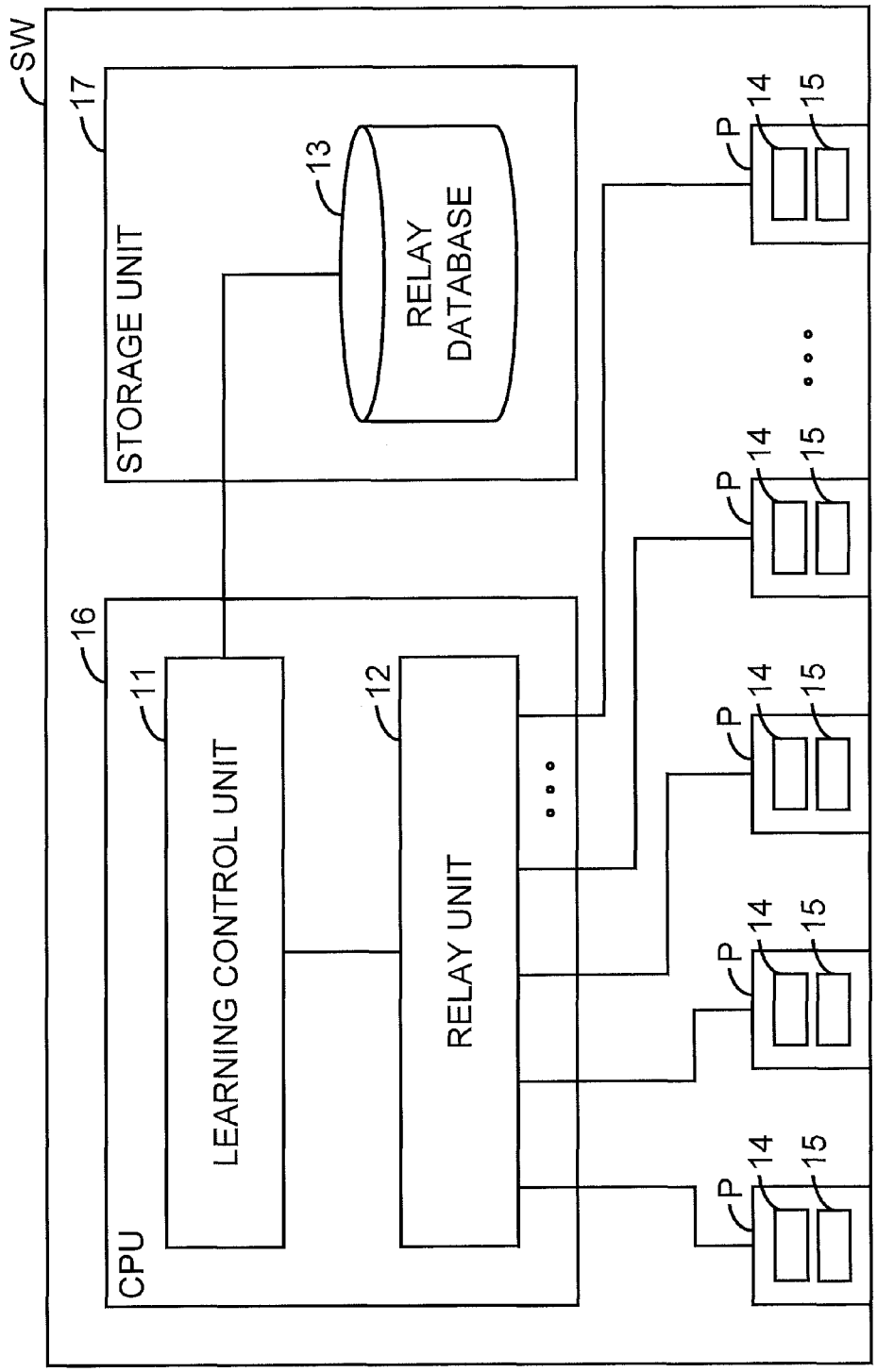
FIG. 7 is a diagram illustrating an exemplary configuration of a switch according to an embodiment of the present invention.

FIG. 7 illustrates an exemplary configuration of a switch according to an embodiment of the present invention. In the present embodiment, each switch SW includes a learning control unit 11, a relay unit 12, a relay database (DB) 13, ports P, and so on.

The learning control unit 11 is a circuit that learns the correspondence between the port P and the corresponding node on the basis of a frame that is received. Specifically, the learning control unit 11 records information indicating the correspondence between a source media access control (MAC) address of the received frame and the reception port (or an output port) in the relay DB 13. Such information is hereinafter referred to as correspondence information. The relay DB 13 is an example of correspondence information storing means that uses a memory of the switch SW to record the correspondence information between the port P and the node (MAC address thereof).

The learning control unit 11 also controls a frame that is received through a line belonging to a link aggregation group so as not to return (reflux) to the source node of the frame. For example, the learning control unit 11 controls a frame that is transmitted from the external node A through the link La1 and that is received by the switch SW1 so as not to be transferred from the switch SW2 to the external node A through the link La2.

The relay unit 12 is a circuit that relays frames, which is a basic function of the switch SW, and so on. Specifically, when the correspondence information between a destination MAC address of a received frame and a corresponding port thereto is registered in the relay DB 13, the relay unit 12 transmits the received frame via the corresponding port. When the correspondence information between the destination MAC address of the received frame and the corresponding port thereto is not registered in the relay DB 13, the relay unit 12 performs flooding. The flooding means that the received frame is transmitted via all the ports other than the reception port because the port to which the destination node is connected is not known when the destination of the received frame is not registered in the relay DB 13.

The functions of learning control unit 11 and the relay unit 12 may be achieved by a central processing unit (CPU) 16 of the switch SW by executing programs stored in a storage unit 17. The relay DB 13 may be stored in the storage unit 17.

The port P is an interface to which a line is connected. Each port P includes, for example, a flooding inhibition unit 14 and a filtering unit 15.

Figure 8:
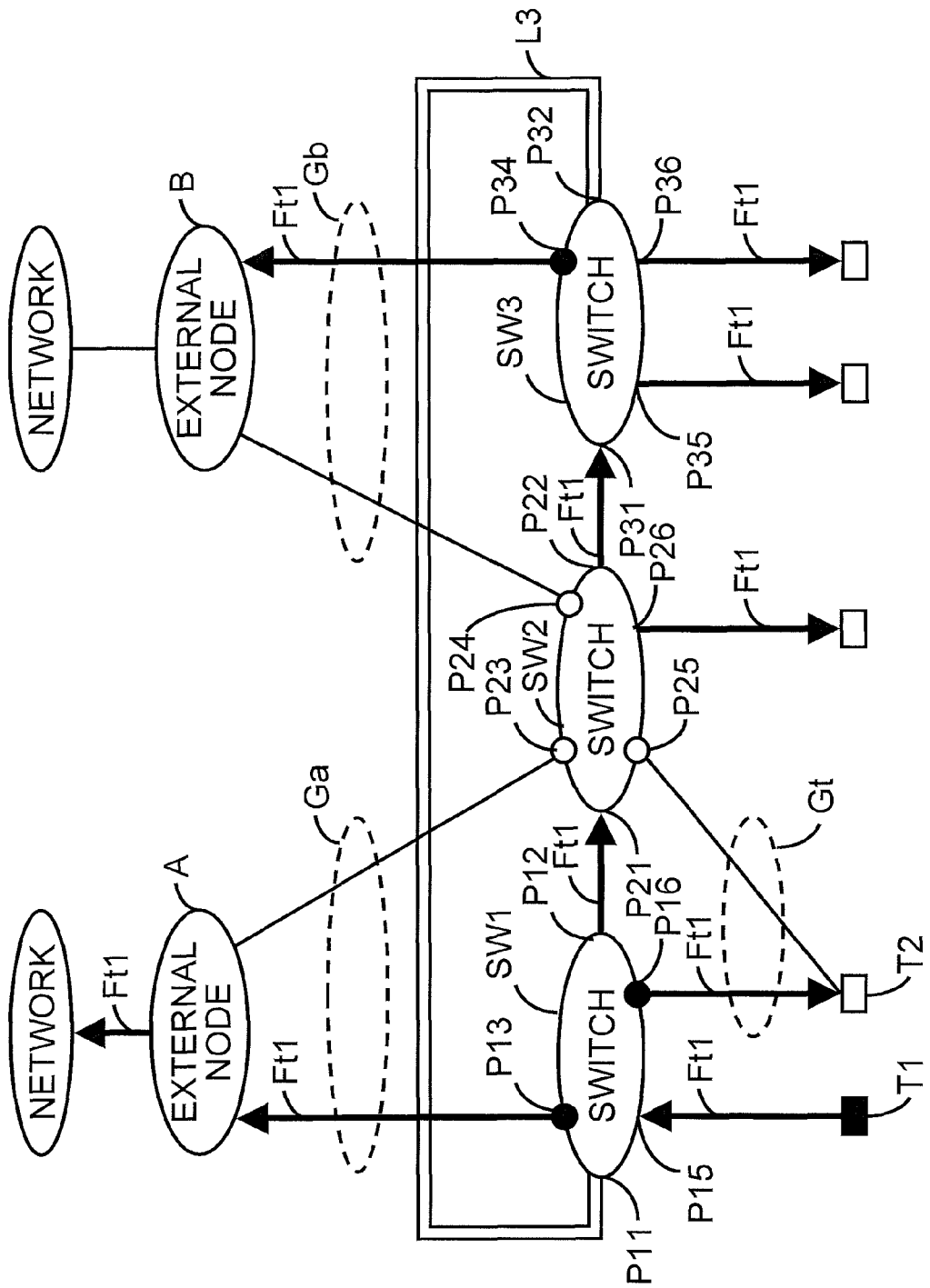
FIG. 8 is a diagram illustrating an example of control performed by a filtering unit according to an embodiment of the present invention.

The flooding inhibition unit 14 manages (holds) information indicating whether the corresponding port P is in a flooding inhibited state. For example, the flooding inhibition unit 14 uses a storage area corresponding to one bit in a memory in the port P. It is indicated that the port P is in the flooding inhibited state when the flooding inhibition unit 14 (the corresponding bit) has a value of ON (1), and it is indicated that the port P is not in the flooding inhibited state when the flooding inhibition unit 14 (the corresponding bit) has a value of OFF (0). The frame to be transmitted via the port P (hereinafter referred to as a flooding inhibited port) in the flooding inhibited state is limited to a frame whose destination is a MAC address corresponding to the flooding inhibited port P. In other words, no frame is transmitted via the flooding inhibited port in the flooding. Setting a port P connected to a redundant path to the flooding inhibited state prevents an occurrence of the frame storm caused by the switch stack 1 having the redundant path. The redundant path is the stack link L3 in the present embodiment. Accordingly, as illustrated in FIG. 8, a port P11 of the switch SW1 and a port P32 of the switch SW3, connected to the stack link L3, are in the flooding inhibited state.

The filtering unit 15 is a circuit that controls identical multiple frames so as not to redundantly reach the same external node connected to the switch stack 1 through a link aggregation group. For example, the filtering unit 15 controls a frame destined for the external node A, received by the switch SW1, so as not to reach the external node A through the two lines: the link La1 and the link La1.

The filtering unit 15 will now be discussed in detail. The filtering units 15 are valid in ports P connected to lines belonging to a link aggregation group, and invalid in the remaining ports P. "Invalid" means a state equivalent to the state in which the corresponding port P has no filtering unit 15. Ports P connected to lines belonging to a link aggregation group are hereinafter referred to as ports P constituting a link aggregation group.

A condition (hereinafter referred to as a passage condition) to permit transmission of a frame in broadcasting is set in the filtering unit 15 in each of ports P constituting the same link aggregation group. The broadcasting means transmission of a frame via the ports P other than the reception port and includes the flooding in the present embodiment. The passage condition is set so that one port P is alternatively selected from multiple ports P constituting the same link aggregation group. In other words, the passage condition is set so that two or more ports P are not selected and only one port P is selected without exception.

FIG. 8 illustrates a first example of the control performed by the filtering unit 15. Referring to FIG. 8, ports P connected to lines belonging to a link aggregation group are denoted by black circles (●) or white circles (○).

The passage condition of the filtering unit 15 in the port P denoted by the black circle is that a final bit (SA[0]) of the source MAC address (SA) of the received frame has a value of zero (0). When this passage condition is denoted by f1, the passage condition f1 is represented as follows.

f1: SA[0]=0

The passage condition f1 is set for a port P13, a port P16, and a port P34 in the example in FIG. 8.

The passage condition of the filtering unit 15 in the port P denoted by the white circle is that the final bit (SA[0]) of the source MAC address (SA) of the received frame has a value of one (1). When this passage condition is denoted by f2, the passage condition f2 is represented as follows.

f2: SA[0]=1

The passage condition f2 is set for a port P23, a port P24, and a port P25 in the example in FIG. 8.

How the passage condition is set will now be discussed for each link aggregation group. As for the ports P constituting the link aggregation group Ga, the passage condition f1 is set for the port P13 and the passage condition f2 is set for the port P23. As for the ports P constituting the link aggregation group Gb, the passage condition f2 is set for the port P24 and the passage condition f1 is set for the port P34. As for the ports P constituting the link aggregation group Gt, the passage condition f1 is set for the port P16 and the passage condition f2 is set for the port P25. As discussed above, the passage conditions of the respective ports P connected to the lines belonging to the same link aggregation group are exclusively or alternatively set.

A relay path of a frame Ft1 that is transmitted from the terminal T1 and received at the port P15 in the switch SW1 is illustrated in the example in FIG. 8. It is assumed that the value of SA[0] of the frame Ft1 is zero (0). It is also assumed that each switch SW has not learned the destination MAC address of the frame Ft1.

Since the switch SW1 receiving the frame Ft1 has not learned the destination MAC address of the frame Ft1, the switch SW1 attempts to flood the frame Ft1. However, the port P11 is excluded from the transmission ports of the frame Ft1 because the port P11 is in the flooding inhibited state. As a result, the frame Ft1 is transmitted via the ports P13, P12, and P16. The passage condition f1 is set for the ports P13 and P16. Since the value of SA[0] of the frame Ft1 is zero (0), the passage condition f1 is satisfied. Consequently, the filtering unit 15 does not exclude the port P13 from the transmission ports.

The switch SW2 receives at the port P21 the frame Ft1 transmitted via the port P12. Since the switch SW2 has not learned the destination MAC address of the frame Ft1, the switch SW2 attempts to flood the frame Ft1. However, the passage condition f2 is set for the ports P23, P24, and P25. Since the value of SA[0] of the frame Ft1 is zero (0), the passage condition f2 is not satisfied. Consequently, the filtering unit 15 in each of the ports P23, P24, and P25 inhibits the transmission of the frame Ft1. As a result, the frame Ft1 is transmitted via the ports P22 and P26.

The switch SW3 receives at the port P31 the frame Ft1 transmitted via the port P22. Since the switch SW3 has not learned the destination MAC address of the frame Ft1, the switch SW3 attempts to flood the frame Ft1. However, the port P32 is excluded from the transmission ports of the frame Ft1 because the port P32 is in the flooding inhibited state. As a result, the frame Ft1 is transmitted via the ports P34, P35, and P36. The passage condition f1 is set for the port P34. Since the value of SA[0] of the frame Ft1 is zero (0), the passage condition f1 is satisfied. Consequently, the filtering unit 15 does not exclude the port P34 from the transmission ports.

Figure 9:
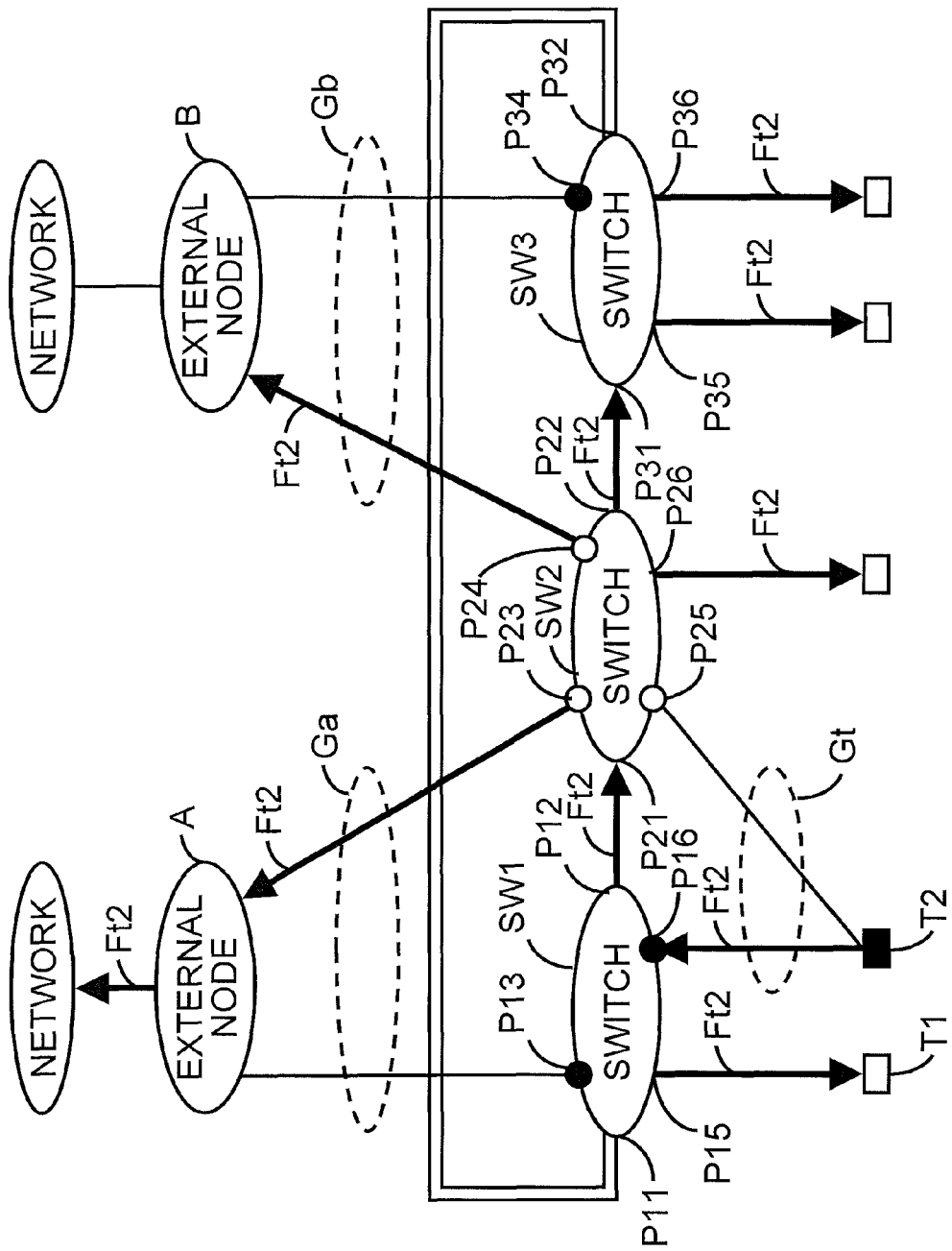
FIG. 9 is a diagram illustrating an example of control performed by a filtering unit according to an embodiment of the present invention.

FIG. 9 illustrates a second example of the control performed by the filtering unit 15. A relay path of a frame Ft2 that is transmitted from the terminal T2 and received at the port P16 in the switch SW1 is illustrated in the example in FIG. 9. It is assumed that the value of SA[0] of the frame Ft2 is one (1). It is also assumed that each switch SW has not learned the destination MAC address of the frame Ft2.

Since the switch SW1 receiving the frame Ft2 has not learned the destination MAC address of the frame Ft2, the switch SW1 attempts to flood the frame Ft2. However, the port P11 is excluded from the transmission ports of the frame Ft2 because the port P11 is in the flooding inhibited state. The passage condition f1 is set for the port P13. Since the value of SA[0] of the frame Ft2 is one (1), the passage condition f1 is not satisfied. Consequently, the filtering unit 15 in the port P13 inhibits the transmission of the frame Ft2. As a result, the frame Ft2 is transmitted via the ports P12 and P15.

The switch SW2 receives at the port P21 the frame Ft2 transmitted via the port P12. Since the switch SW2 has not learned the destination MAC address of the frame Ft2, the switch SW2 attempts to flood the frame Ft2. However, the passage condition f2 is set for the ports P23, P24, and P25. Since the value of SA[0] of the frame Ft2 is one (1), the passage condition f2 is satisfied. Consequently, the filtering unit 15 in each of the ports P23, P24, and P25 permits the transmission of the frame Ft2. As a result, the frame Ft2 is transmitted via the ports P22, P23, P24, and P26. Although the passage condition f2 is satisfied for the port P25, the port P25 is excluded from the transmission ports of the frame Ft2 because of the effect (discussed below) of the learning control unit 11. This exclusion is performed in order to avoid reflux of the frame Ft2 to the terminal T2, which is the source node of the frame Ft2.

The switch SW3 receives at the port P31 the frame Ft2 transmitted via the port P22. Since the switch SW3 has not learned the destination MAC address of the frame Ft2, the switch SW3 attempts to flood the frame Ft2. However, the port P32 is excluded from the transmission ports of the frame Ft2 because the port P32 is in the flooding inhibited state. The passage condition f1 is set for the port P34. Since the value of SA[0] of the frame Ft2 is one (1), the passage condition f1 is not satisfied. Consequently, the filtering unit 15 in the port P34 inhibits the transmission of the frame Ft2. As a result, the frame Ft2 is transmitted via the ports P35 and P36.

As illustrated in FIG. 8 and FIG. 9, the control performed by the filtering unit 15 prevents the identical frames from being redundantly transferred to the same node (the external node A, the external node B, or the terminal T2) through the lines belonging to the same link aggregation group. In addition, the use of a value, such as a source MAC address, that may vary depending on the frame as a passage condition prevents the frequency of the usage of each line belonging to the same link aggregation group from being greatly biased. For example, the lines used for the transfer of the frame Ft1 in FIG. 8 are different from the lines used for the transfer of the frame Ft2 in FIG. 9.

The passage condition is not limited to certain values as long as the result of determination is selective. For example, the passage condition may be set by using another bit or multiple bits of the source MAC address. Alternatively, among the information included in the frame to be relayed, information, such as the destination MAC address, other than the source MAC address may be employed. Alternatively, information (for example, time) other than the information that is included in the frame to be relayed may be employed to set the passage condition. When information other than the information that is included in the frame is employed, the employed information preferably dynamically varies. This is because, if the information is fixed, the result of determination of the passage condition is fixed and, thus, the lines that are used are fixed, among the lines belonging to the same link aggregation group. It is preferred that the passage condition be set for the information that may be varied depending on the frame to be relayed, as in the present embodiment, in terms of the randomness of the result of determination of the passage condition.

The effectiveness of the filtering unit 15 is not limited to the case in which two lines belong the same link aggregation group. When N (N is equal to two or more) lines belong to the same link aggregation group, it is sufficient for the passage condition from which N results of determination may be exclusively acquired to be set for the ports P constituting the same link aggregation group. For example, when three lines belong to the same link aggregation group and the source MAC address is used, as in the present embodiment, the passage condition may be set for a certain value having at least two bits. In this case, zero (0) may be allocated to the two-bit value of a first line, one (1) may be allocated to the two-bit value of a second line, and two (2) and three (3) may be allocated to the two-bit value of a third line. Alternatively, in order to improve the equality of the loads of the three lines, three (3) may be allocated to different lines in accordance with other information (for example, time). Alternatively, by allocating a line number (a value from one (1) to N) to each line, the passage condition may be set for line number corresponding to the remainder after division of a common value (for example, all or part of the bits of the source MAC address).

Alternatively, cyclic redundancy check (CRC) may be applied to certain information (for example, the source MAC address) and the passage condition may be set for the port number corresponding to the remainder after the CRC.

Figure 10:
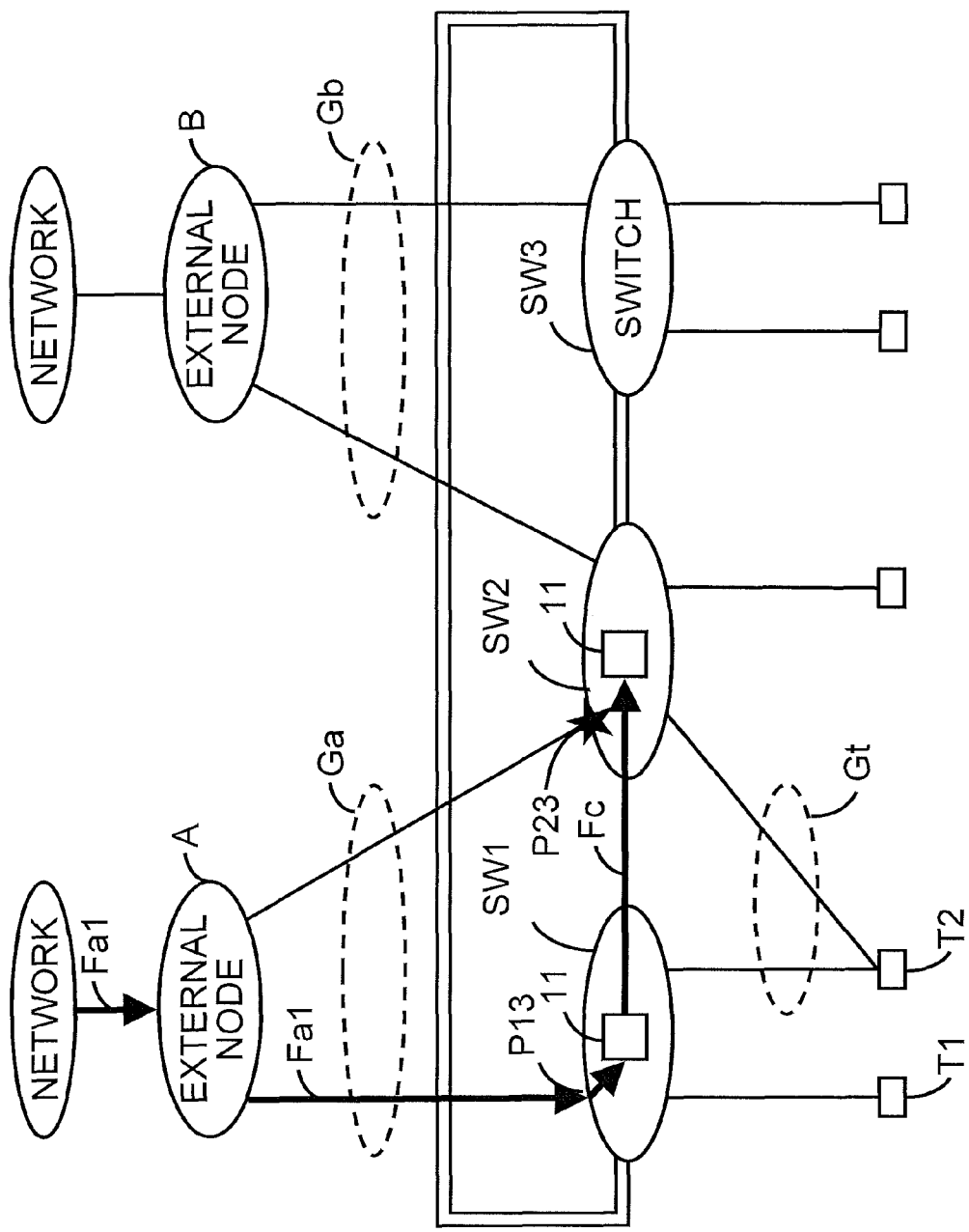
FIG. 10 is a diagram illustrating an example of control performed by a learning control unit according to an embodiment of the present invention.

The learning control unit 11 will now be discussed in detail. FIG. 10 illustrates a first example of the control performed by the learning control unit 11.

A process performed by the learning control unit 11 when the switch SW1 receives a frame Fa1 from the external node A through a line belonging to the link aggregation group Ga is illustrated in the example in FIG. 10. It is assumed that each switch SW has not learned the source MAC address of the frame Fa1.

Upon reception of the frame Fa1 by the switch SW1, the learning control unit 11 in the switch SW1 searches the relay DB 13 for the source MAC address of the frame Fa1. If the source MAC address has not been registered in the relay DB 13 (that is, the switch SW1 has not learned the source MAC address), the learning control unit 11 notifies the switch SW2 constituting the link aggregation group Ga of the reception, through the link aggregation group Ga, of the frame Fa1 including an address (hereinafter referred to as an unlearned address) that has not been learned. Specifically, the learning control unit 11 transmits a control frame including the unlearned address and an identifier (hereinafter referred to as an LAG identifier) of the link aggregation group Ga to the switch SW2. Such a control frame is hereinafter referred to as a learning instruction frame Fc.

The learning of the unlearned address is normally performed in the switch SW1. Specifically, the correspondence information between the port P13 and the unlearned address is registered in the relay DB 13 in the switch SW1.

Information indicating which link aggregation group each port P constitutes is included in, for example, topology information stored in each switch SW. Alternatively, the LAG identifier of the link aggregation group to which the port P is connected may be set for each port P constituting the link aggregation group. In either of the cases, each switch SW may determine through which link aggregation group the frame is transmitted on the basis of the reception port P of the frame.

After transmitting the learning instruction frame Fc, the switch SW1 relays the frame Fa1.

Upon reception of the learning instruction frame Fc by the switch SW2, the learning control unit 11 in the switch SW2 learns the unlearned address included in the learning instruction frame Fc in association with the port P23. Specifically, in the switch SW2, the correspondence information between the port P23 constituting the link aggregation group Ga and the unlearned address is registered in the relay DB 13. Referring to FIG. 10, an asterisk (★) indicates that the unlearned address has been learned.

When three or more switches SW constitute the link aggregation group Ga, the learning instruction frame Fc is transferred to each switch SW.

In other words, when a frame whose source MAC address has not been learned is received through a link aggregation group, each switch SW constituting the link aggregation group learns the unlearned address in association with the port P constituting the link aggregation group.

Figure 11:
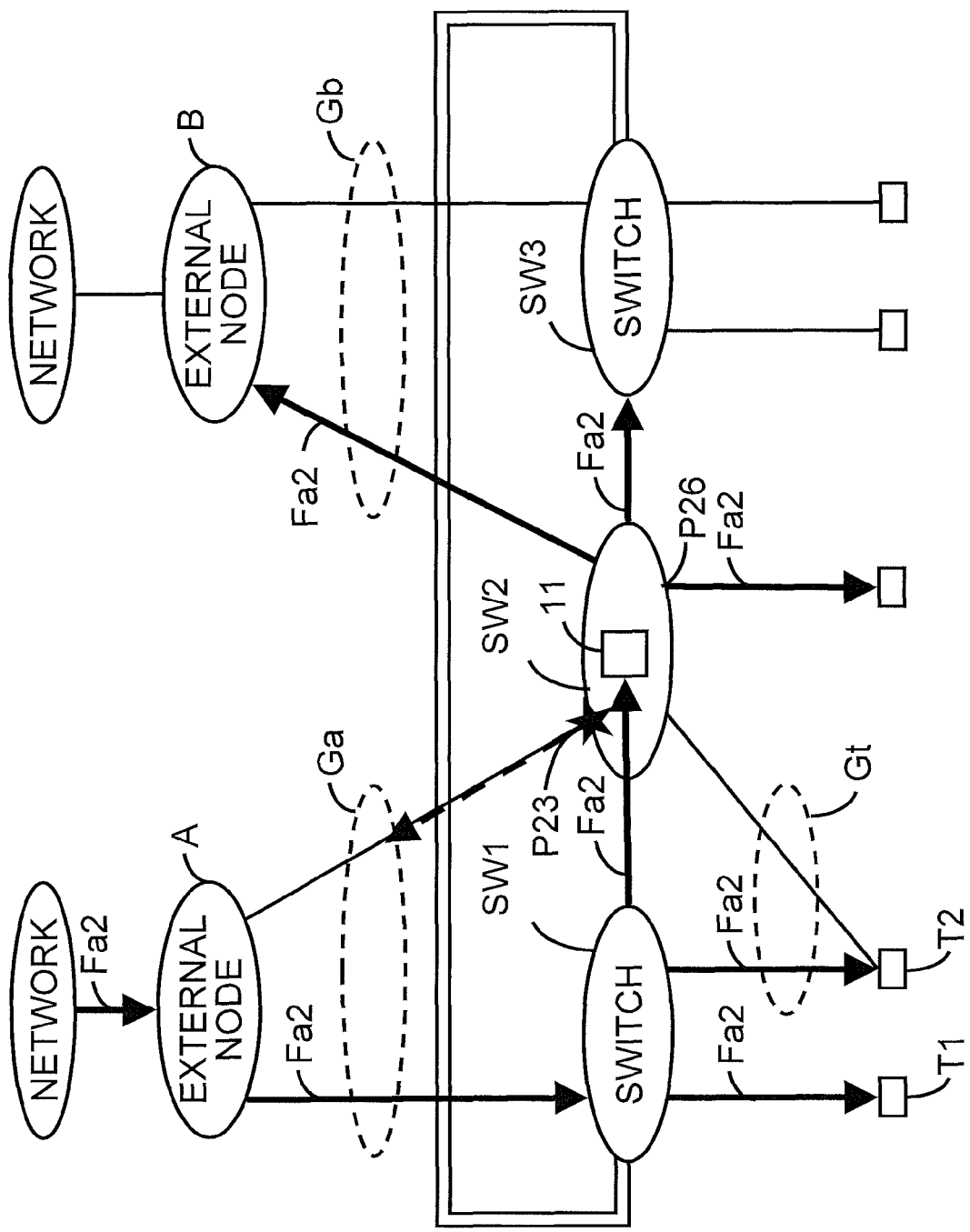
FIG. 11 is a diagram illustrating an example of control performed by a learning control unit according to an embodiment of the present invention.

FIG. 11 illustrates a second example of the control performed by the learning control unit 11.

A process performed by the learning control unit 11 when the switch SW1 receives a frame Fat from the external node A through a line belonging to the link aggregation group Ga is illustrated in the example in FIG. 11. It is assumed in FIG. 11 that the control process in FIG. 10 has been performed and that the source MAC address of the frame Fa2 is the same as that of the frame Fa1 in FIG. 10.

Upon reception of the frame Fa2 by the switch SW1, the learning control unit 11 in the switch SW1 searches the relay DB 13 for the source MAC address of the frame Fa2. If the source MAC address has been registered in the relay DB 13, the learning control unit 11 searches the relay DB 13 for the destination MAC address. If the destination MAC address has not been registered in the relay DB 13, the switch SW1 floods the frame Fa2. As a result, the frame Fa2 is transferred to the switch SW2.

Upon reception of the frame Fa2 by the switch SW2, the learning control unit 11 in the switch SW2 searches the relay DB 13 for the source MAC address of the frame Fa2. The source MAC address has been learned in association with the port P23 in the control process in FIG. 10. Accordingly, relearning is normally performed for the source MAC address. Specifically, the source MAC address is learned in association with the port P21 via which the frame Fa2 is received. However, in the present embodiment, the learning control unit 11 does not relearn the address that has been learned when the frame is received through a stack link. Whether each port P is connected to a stack link may be determined on the basis of the topology information stored in each switch SW. Alternatively, information indicating whether each port P is connected to a stack link may be set for the port P.

Referring to FIG. 11, the switch SW2 receives the frame Fa2 through the stack link. Accordingly, the learning control unit 11 in the switch SW2 does not relearn the source MAC address of the frame Fa2.

The reason for not updating the learning result (the relay DB 13) of a source MAC address of a frame in response to a frame received through the stack link is because a shortest path has already been registered for the source MAC address in response to the learning instruction frame Fc. In other words, this is because, if the learning result concerning the source MAC address is updated in association with the port P connected to the stack link, the relay path for the source MAC address is lengthened.

Thereafter, the switch SW2 relays the frame Fa2. In the relay process, transmission of the frame Fa2 via the port P corresponding to the source MAC address of the frame Fa2 is inhibited by the learning control unit 11. As a result, the reflux of the frame Fa2 to the external node A is avoided. Referring to FIG. 11, a broken-line arrow indicates that the transmission of the frame Fa2 via the port P23 is inhibited.

An operation flow of each switch SW for performing the process discussed above with reference to FIGS. 8 to 11 will now be discussed with reference to FIGS. 12 to 15.

Figure 12:
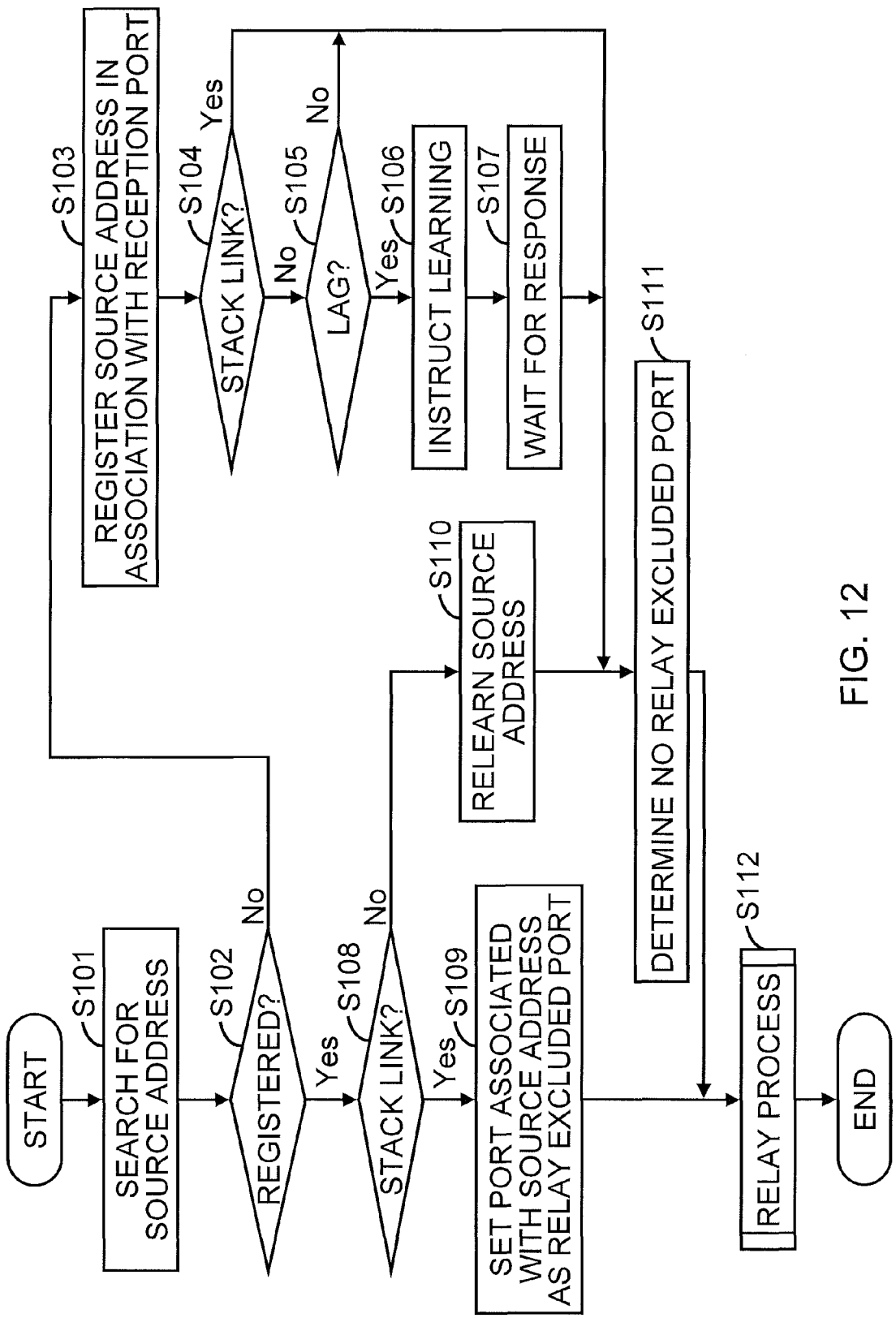
FIG. 12 is a diagram illustrating an exemplary operation flow of a switch according to an embodiment of the present invention.

FIG. 12 illustrates an exemplary operation flow of a process performed by a switch in response to reception of a frame. The operation flow illustrated in FIG. 12 is executed by one switch SW that has received a frame. Accordingly, the components (for example, the learning control unit 11) mentioned in the discussion with reference to FIG. 12 are included in the same switch SW.

In S101, in response to reception of a frame, the learning control unit 11 searches the relay DB 13 for the source MAC address of the received frame.

In S102, the learning control unit 11 determines whether the source MAC address of the received frame is already registered in the relay DB 13.

In S103, when the source MAC address of the received frame is not yet registered in the relay DB 13 ("No" in S102), the learning control unit 11 registers the correspondence information between the source MAC address and the reception port in the relay DB 13.

In S104, the learning control unit 11 determines whether the reception port P is connected to a stack link.

In S105, when the reception port P is not connected to a stack link ("No" in S104), the learning control unit 11 determines whether the reception port P constitutes a link aggregation group.

In S106, when the reception port P constitutes a link aggregation group ("Yes" in S105), the learning control unit 11 transmits a learning instruction frame to another switch SW having another port P constituting the link aggregation group. The learning instruction frame corresponds to the learning instruction frame Fc in FIG. 10. Accordingly, the learning instruction frame includes the LAG identifier of the link aggregation group and the source MAC address of the received frame. S103 to S106 correspond to FIG. 10.

In S107, the learning control unit 11 waits for reception of a control frame as a response from the destination of the learning instruction frame.

In S111, upon reception of the response, the learning control unit 11 determines that no relay excluded port exists.

In S112, the learning control unit 11 causes the relay unit 12 to perform the relay process. The relay excluded port means a port P excluded from the transmission ports of the received frame. As the basic control of the switch SW, no received frame is transmitted via the reception port P. The relay excluded port is a port P, among the ports other than the reception port P, excluded from the transmission ports of the received frame in order to prevent the reflux of the received frame.

When the reception port P is connected to a stack link ("Yes" in S104) or when the reception port P does not constitute a link aggregation group ("No" in S105), S111 and S112 are performed without performing the transmission of the learning instruction frame, etc. of S106 and S107.

In S108, when the source MAC address of the received frame is already registered in the relay DB 13 ("Yes" in S102), the learning control unit 11 determines whether the reception port P is connected to a stack link.

In S109, when the reception port P is connected to a stack link ("Yes" in S108), the learning control unit 11 sets the port P associated with the source MAC address as a relay excluded port.

In S110, when the reception port P is not connected to a stack link ("No" in S108), the learning control unit 11 relearns the source MAC address. Specifically, the learning control unit 11 updates the relay DB 13 so that the source MAC address is associated with the reception port P.

In S111, the learning control unit 11 determines that no relay excluded port exists.

In S112, the learning control unit 11 causes the relay unit 12 to perform the relay process after S109 or S111.

S108 to S110 correspond to FIG. 11.

An operation flow of a switch SW that has received the learning instruction frame transmitted in S106 will now be discussed.

Figure 13:
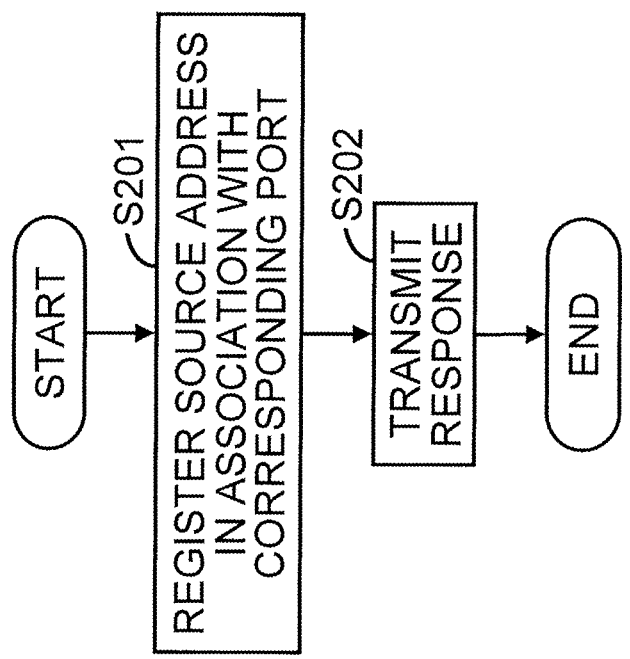
FIG. 13 is a diagram illustrating an exemplary operation flow of a switch according to an embodiment of the present invention.

FIG. 13 illustrates an exemplary operation flow of a switch that has received the learning instruction frame.

In S201, the learning control unit 11 in the switch SW that has received the learning instruction frame updates the relay DB 13 on the basis of the learning instruction frame. Specifically, the learning control unit 11 registers in the relay DB 13 the correspondence information between the port P, that constitutes the link aggregation group concerning the LAG identifier, and the source MAC address both included in the learning instruction frame.

In S202, the learning control unit 11 returns a frame as a response to the learning instruction frame.

Figure 14:
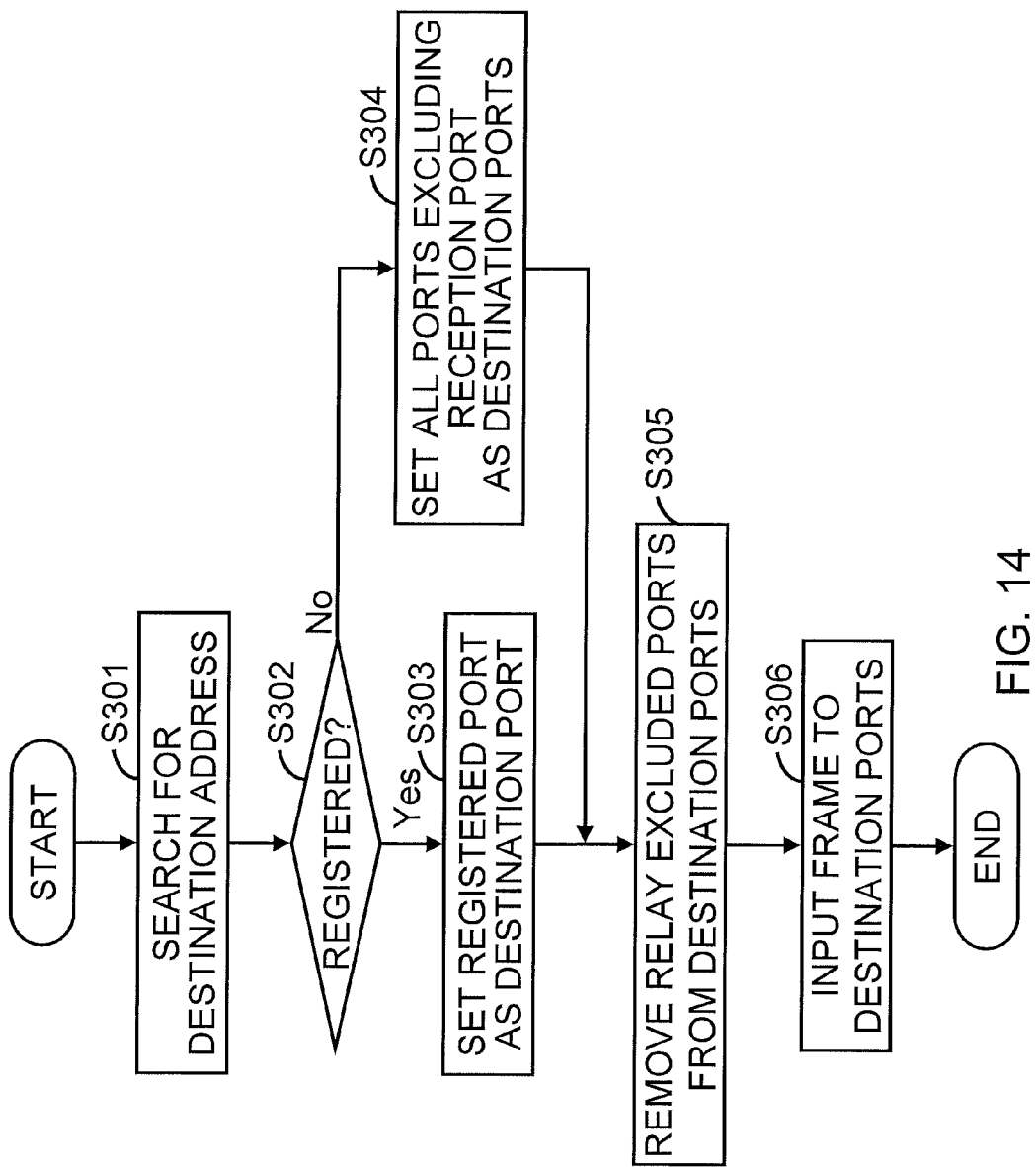
FIG. 14 is a diagram illustrating an exemplary operation flow of a switch according to an embodiment of the present invention.

S112 in FIG. 12 will now be discussed in detail. FIG. 14 illustrates an exemplary operation flow of the relay process performed by the relay unit 12.

In S301, the relay unit 12 searches the relay DB 13 for the destination MAC address of the received frame.

In S302, the relay unit 12 determines whether the destination MAC address of the received frame is already registered in the relay DB 13.

In S303, when the destination MAC address of the received frame is already registered in the relay DB 13 ("Yes" in S302), the relay unit 12 sets the port P registered in association with the destination MAC address as a port P (hereinafter referred to as a destination port) to which the received frame is to be transmitted.

In S304, when the destination MAC address of the received frame is not yet registered in the relay DB 13 ("No" in S302), the relay unit 12 sets all the ports P excluding the reception port P as the destination ports.

In S305, after S303 or S304, the relay unit 12 removes relay excluded ports from the destination ports.

In S306, the relay unit 12 inputs the received frame to each destination port excluding the relay excluded port as a transmission target frame.

An operation flow of a port P to which the transmission target frame is input will now be discussed.

Figure 15:
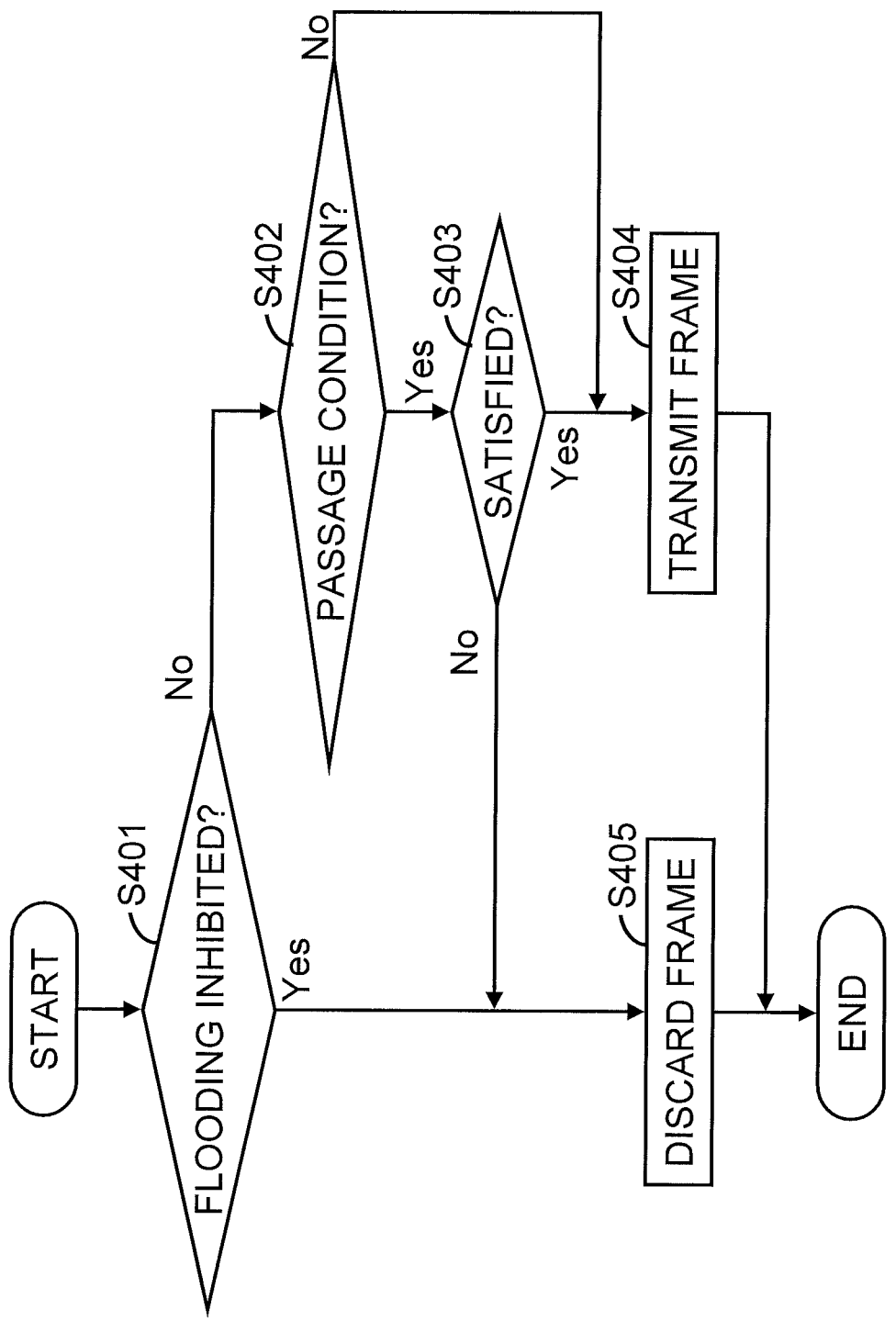
FIG. 15 is a diagram illustrating an exemplary operation flow of a switch according to an embodiment of the present invention.

FIG. 15 illustrates an exemplary operation flow of the port P to which the transmission target frame is input.

In S401, the flooding inhibition unit 14 in the port P determines whether the port P is in the flooding inhibited state.

In S405, when the port P is in the flooding inhibited state ("Yes" in S401), the filtering unit 15 discards the frame. In this case, no frame is transmitted via the port P.

In S402, when the port P is not in the flooding inhibited state ("No" in S401), the filtering unit 15 determines whether the passage condition is set. In other words, it is determined whether the filtering unit 15 is valid. This determination may be replaced with determination of whether the port P constitutes a link aggregation group.

In S403, when the passage condition is set ("Yes" in S402), the filtering unit 15 determines whether the passage condition is satisfied.

In S404, when the passage condition is satisfied ("Yes" in S403) or when the passage condition is not set ("No" in S402), the frame is transmitted via the port P.

In S405, when the passage condition is not satisfied ("No" in S403), the filtering unit 15 discards the frame.

As discussed above, according to the present embodiment, even if multiple lines belonging to a link aggregation group are connected to different switches SW, it is possible to appropriately relay a frame. In other words, redundant transfer of identical frames to the same node or reflux of a frame to a source node is avoided. Avoiding reflux of a frame may avoid frame storm caused by a loop of physical lines. Accordingly, it is possible to improve the usefulness of the link aggregation connected from one node to multiple switches.

The filtering unit 15 may not necessarily be provided in each port P but one filtering unit 15 may be provided in one switch SW. In this case, the filtering unit 15 may determine via which port the frame is transmitted on the basis of the passage condition of each port P stored in the memory in the switch SW. For example, at the beginning of the operation flow illustrated in FIG. 14, the determination of the passage condition may be performed by the filtering unit 15 and the port that is not set as a transmission port may be added to the relay excluded ports.

The passage condition is set for the filtering unit 15 in the present embodiment, however, a filtering condition may be set for the filtering unit 15. In other words, a condition in which the frame is not transmitted may be set.

The flooding inhibition unit 14 is applied as a countermeasure against the redundant path in the switch stack 1 in the present embodiment. However, a conventional method, for example, a method using Standard Template Library (STL) or the TTL, may be adopted as means for avoiding the disadvantages of the redundant path. In such a case, the switch SW may not include the flooding inhibition unit 14. When the switch stack 1 has no redundant path, it is not necessary to prepare the means for avoiding the disadvantages of the redundant path.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been discussed in detail, it should be understood that the various changes, substitutions, and alterations could be made hereto without departing from the spirit and scope of the invention.

What is claimed is:
1. A relay system comprising:
a first relay apparatus connected to a node through a first line; and a second relay apparatus connected to the node through a second line, wherein the first line and the second line belong to the same link aggregation group, the first relay apparatus includes:
- a first storage unit for storing first relation information regarding a relationship between a destination address and an output port of the first relay apparatus, and
- a first control unit to notify, after receiving a frame and before relaying the received frame, the second relay apparatus of a source address included in the received frame in the absence of first relation information related to the source address in the first storage unit upon receiving the received frame via a port connected to the first line, and the second relay apparatus includes:
- a second storage unit for storing second relation information regarding a relationship between a destination address and an output port of the second relay apparatus, and
- a second control unit to store, in the second storage unit, second relation information regarding a relationship between the source address notified by the first relay apparatus and an output port connected to the second line.

2. The relay system according to claim 1, wherein the first relay apparatus further includes:
- a filtering unit to inhibit, in accordance with a filtering condition for inhibiting transmission of a frame via each output port, transmission of the received frame via an output port connected to the first line in the absence of first relation information related to the source address in the first storage unit.

3. The relay system according to claim 1, wherein in the presence of second relation information related to the notified source address in the second storage unit, the second control unit holds the present second relation information related to the notified source address without change.

4. The relay system according to claim 3, wherein in the presence of second relation information related to the notified source address in the second storage unit, the second relay apparatus inhibits transmission of the received frame via a port specified in the present second relation information.

5. The relay system according to claim 2, wherein the filtering unit determines whether the filtering condition is satisfied for the received frame to inhibit transmission of the received frame via the output port connected to the first line.

6. A relay apparatus connected to a node through a first line, the relay apparatus comprising:
- a storage unit for storing relation information regarding a relationship between a destination address and an output port of the relay apparatus; and
- a control unit to
    - notify, after receiving a frame and before relaying the received frame, a first external apparatus of a source address included in the received frame in the absence of relation information related to the source address in the storage unit upon receiving the received frame via a port connected to the first line, the first external apparatus being connected to the node through a second line, the first line and the second line belonging to a first link aggregation group, and
    - store, in the storage unit, relation information regarding a relationship between an address notified by a second external apparatus and an output port connected to the first line, the second external apparatus being connected to the node through a third line, the first line and the third line belonging to a second link aggregation group.

7. A relay method executed by a relay system including a first relay apparatus connected to a node through a first line and a second relay apparatus connected to the node through a second line, the first line and the second line belonging to the same link aggregation group, the relay method comprising:
- notifying after receiving a frame and before relaying the received frame, by the first relay apparatus, the second relay apparatus of a source address included in the received frame in the absence of first relation information related to the source address in a first storage unit upon receiving the received frame via a port connected to the first line, the first storage unit storing first relation information regarding a relationship between a destination address and an output port of the first relay apparatus; and
- storing in a second storage unit, by the second relay apparatus, second relation information regarding a relationship between the source address notified by the first relay apparatus and an output port connected to the second line.

8. The relay method according to claim 7, further comprising:
- inhibiting in accordance with a filtering condition for inhibiting transmission of a frame via each output port, by the first relay apparatus, transmission of the received frame via an output port connected to the first line in the absence of first relation information related to the source address in the first storage unit.

9. The relay method according to claim 7, wherein in the presence of second relation information related to the notified source address in the second storage unit, the second relay apparatus holds the present second relation information related to the notified source address without change.

10. The relay method according to claim 9 wherein in the presence of second relation information related to the notified source address in the second storage unit, the second relay apparatus inhibits transmission of the received frame via a port specified in the present second relation information.

11. The relay method according to claim 8, wherein the first relay apparatus determines whether the filtering condition is satisfied for the received frame to inhibit transmission of the received frame via the output port connected to the first line.

* * * * *